United States Patent
Kikuchi et al.

(10) Patent No.: US 6,223,023 B1
(45) Date of Patent: Apr. 24, 2001

(54) TRANSMITTER-RECEIVER UNIT FOR PORTABLE TELEPHONE

(75) Inventors: Jiro Kikuchi; Yoshio Saito; Satoshi Urabe, all of Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/334,882

(22) Filed: Jun. 17, 1999

(30) Foreign Application Priority Data

Jun. 23, 1998 (JP) .................................................. 10-175646

(51) Int. Cl.⁷ ....................................................... H04B 1/38
(52) U.S. Cl. ............................................... 455/90; 455/347
(58) Field of Search .............................. 455/90, 575, 550, 455/347, 348, 66, 74, 82, 83; 379/433, 434; 343/702

(56) References Cited

U.S. PATENT DOCUMENTS

| | | | |
|---|---|---|---|
| 5,711,013 | * 1/1998 | Collett et al. | 455/90 |
| 5,736,965 | * 4/1998 | Mosebrook et al. | 343/702 |
| 6,018,213 | * 8/2000 | Yamamoto | 455/575 |
| 6,107,971 | * 8/2000 | Flegeo | 343/702 |
| 6,148,183 | * 11/2000 | Higdon et al. | 455/90 |

FOREIGN PATENT DOCUMENTS 10-163650   6/1998   (JP) .

* cited by examiner

Primary Examiner—Nay Maung
Assistant Examiner—Quochien B. Vuong
(74) Attorney, Agent, or Firm—Brinks Hofer Gilson & Lione

(57) ABSTRACT

According to the present invention there is provided a transmitter-receiver unit for a portable telephone, comprising a transmission circuit block, a reception circuit block, an antenna terminal member with an antenna connected thereto for transmitting a transmission signal outputted from the transmission circuit block and for receiving a reception signal to be inputted to the reception circuit block, an antenna duplexer connected to the antenna terminal member, a printed wiring board having connectors and wiring patterns, the connectors having terminals connected to the transmission circuit block and the reception circuit block and also connected to the wiring patterns, and a frame for holding the printed wiring board, wherein the antenna terminal member is disposed at a corner position of one side of the printed wiring board, and the connectors are formed so that they each can be disposed at any of opposed positions on both sides of the printed wiring board.

3 Claims, 5 Drawing Sheets

TRANSMITTER-RECEIVER UNIT FOR PORTABLE TELEPHONE

BACKGROUND OF THE INVENTION

1. Field of the Invention

The present invention relates to a transmitter-receiver unit for a portable telephone and more particularly to a transmitter-receiver unit for a portable telephone which is applicable to both a right-hand antenna type portable telephone and a left-hand antenna type portable telephone.

2. Description of the Related Art

With reference to drawings, a description will be given below of a right-hand antenna type portable telephone using a conventional transmitter-receiver unit for a portable telephone.

FIG. 5 is a sectional view of a right-hand antenna type portable telephone using a conventional transmitter-receiver unit for a portable telephone, FIG. 6 is a plan view of a principal portion thereof, FIG. 7 is an exploded perspective view thereof, and FIG. 8 is a sectional view thereof.

As shown in FIGS. 5 to 8, a case 21 is formed in a generally box shape by molding using a synthetic resin and it comprises side walls 21a as surrounding walls, as well as a surface wall 21b and a back wall 21c which close the upper and lower sides, respectively, of the space defined by the side walls.

A mother board 22 is formed in the shape of a flat plate using an insulating resin material. On the mother board are mounted electronic components (not shown) such as a memory element for the storage of telephone numbers, etc. and an arithmetic element for carrying out various arithmetic operations, as well as a male connector 22a having a plurality of terminals. The mother board 22 is disposed within the case 21 in proximity to the back wall 21c and is secured to the case 21 by a suitable means.

An antenna 24 is formed in a generally cylindrical shape using, for example, a magnetic material and it is for the transmission and reception of, for example, voice signals. The antenna 24 has a rod-like antenna portion 24a capable of being drawn out to the exterior, a knob portion 24b formed at the tip of the antenna portion 24a, and a cylindrical portion 24c for receiving the antenna portion 24a therein.

In the antenna 24, the knob portion 24b of the antenna portion 24a is disposed on the right-hand side of the case 21 in an outwardly projecting state and the cylindrical portion 24c which accommodates the antenna portion 24a therein is disposed inside the case 21 and in proximity to the right-hand side wall 21a.

A transmitter-receiver unit 25 for a portable telephone has a flat plate-like printed wiring board 26 and a generally box-shaped frame 27 for holding the printed wiring board 26.

The printed wiring board 26 is provided on a first side (for example, the surface) thereof with electric components 26a such as crystal oscillator and coil, an antenna terminal member 26b connected to the antenna 21 and formed at a right-hand corner position, an antenna duplexer 26g connected to the antenna terminal member 26b, and a wiring pattern (not shown) of a desired shape. The printed wiring board 26 is also provided on a second side (for example, the back) thereof with electric components 26d such as an integrated circuit (LSI), a chip resistor and a chip capacitor, a female connector 26c having a plurality of terminals (not shown), and a wiring pattern (not shown) of a desired shape.

With the electric components 26a, 26d and the wiring pattern (not shown) there are constituted a transmission circuit block (not shown) which outputs to the antenna 24 a transmission signal for transmitting a signal of voice and the like from the antenna and a reception circuit block (not shown) which receives a reception signal from the antenna 24 and outputs a voice signal on the basis of the reception signal. Both the transmission circuit block and the reception circuit block are connected to the antenna duplexer 26g. A connecting terminal (not shown) of the antenna 24 is connected, for example by soldering, to the antenna terminal member 26b formed at a right-hand corner position of the printed wiring board 26.

The frame 27 is formed in a generally box shape by cutting and bending a metallic flat plate and it comprises side walls 27a as surrounding walls, a bottom wall 27b which closes the lower surface side, and a receptacle portion whose upper surface side is open. In the bottom wall 27b is formed a rectangular hole 27d.

The printed wiring board 26 is mounted and held in the receptacle portion 27c of the frame 27 with use of a suitable means. In this state, the board 26 is located in proximity to the bottom wall 27b, and the female connector 26c is inserted into the hole 27d of the bottom wall 27b.

The transmitter-receiver unit 25 having the printed wiring board 26 and the frame 27 is placed on the mother board 22.

In this state, the male connector 22a of the mother board 22 and the female connector 26c of the printed wiring board 26 are electrically connected with each other. Further, the antenna 24 and the transmitter-receiver unit 25 are located adjacent each other on the mother board 22.

The following description is now provided about a left-hand type portable telephone using the conventional transmitter-receiver unit.

In this left-hand antenna type portable telephone, an antenna is disposed on the right-hand side of a case and an antenna terminal member of a printed wiring board is disposed at a left-hand corner position of the same board, the antenna and the antenna terminal member being connected with each other.

As described above, in the right-hand antenna type portable telephone using the conventional transmitter-receiver unit for a portable telephone, the antenna mounted on the right-hand side of the case and the antenna terminal member disposed at a right-hand corner position of the printed wiring board are connected with each other, and the female connector disposed on the second side (for example, the back) of the printed wiring board and the male connector disposed on the mother board are connected with each other.

However, both the right-hand antenna type portable telephone and the left-hand antenna type portable telephone as a type contrast thereto are popular. In the transmitter-receiver unit used in the left-hand antenna type portable telephone, the antenna is disposed on the left-hand side of the portable telephone, so that the antenna terminal member of the printed wiring board in the transmitter-receiver unit is required to be located at left-hand corner position of the printed wiring board and design is made to meet the requirement.

Thus, in the conventional transmitter-receiver unit for a portable telephone, since the antenna terminal member for the printed wiring board in the left-hand antenna type portable telephone is disposed at a left-hand corner position, separate such transmitter-receiver units are designed, one for the right-hand antenna type portable telephone and the other for the left-hand antenna type portable telephone.

This is because the foregoing construction of the transmitter-receiver unit for the right-hand antenna type portable telephone is not directly applicable to the transmitter-receiver unit for the left-hand antenna type portable telephone in which the antenna terminal member is disposed at a left-hand corner position of the transmitter-receiver unit.

It follows that the transmitter-receiver units for the right and left antenna type portable telephones are required to be designed as separate units, thus giving rise to the problem that the number of design steps increases.

SUMMARY OF THE INVENTION

It is an object of the present invention to provide a transmitter-receiver for a portable telephone capable of solving the above-mentioned problems and capable of being used for both right and left antenna type portable telephones.

The transmitter-receiver unit for a portable telephone according to the present invention comprises: a printed wiring board having a plurality of wiring patterns and a connector connecting portion connected to the wiring patterns; a transmission circuit block for outputting a transmission signal and a reception circuit block for inputting a reception signal, both the transmission circuit block and the reception circuit block being mounted on the printed wiring board and connected to the wiring patterns; an antenna duplexer connected to both the transmission circuit block and the reception circuit block; an antenna terminal member, for the connection of an antenna, the antenna terminal member being mounted on the printed wiring board and connected to the antenna duplexer; at least one connector mounted on the printed wiring board and having a plurality of terminals connected to the connector connecting portion; and a frame for holding the printed wiring board, wherein the antenna terminal member is disposed at a corner position of one side of the printed wiring board, two connector connecting portions are disposed respectively on both sides of the printed wiring board opposedly to each other at positions spaced away from the antenna terminal member, the two connector connecting portions being connected in parallel with each other through a through-hole conductor, and one or two connectors are connected to any one or both of the connector connecting portions.

DETAILED DESCRIPTION OF A PREFERRED EMBODIMENT

A right-handed antenna type portable telephone using a transmitter-receiver for a portable telephone according to the present invention will be described herein under with reference to the accompanying drawings.

Figure 1:
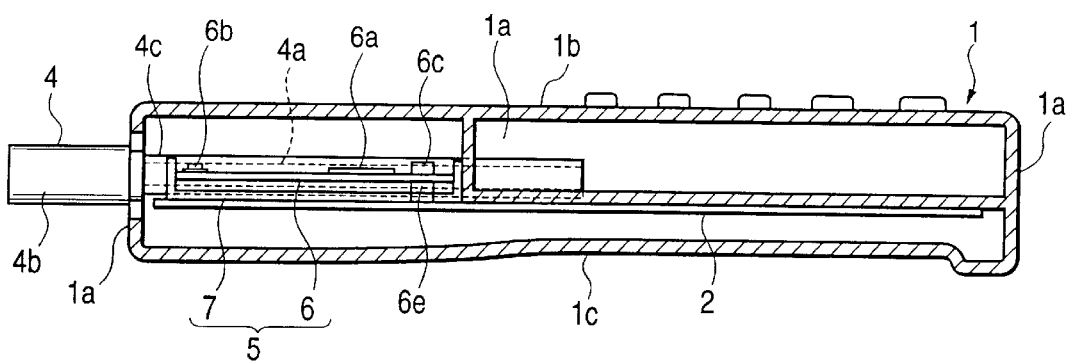
FIG. 1 is a sectional view showing a right-hand antenna type portable telephone using a transmitter-receiver unit for a portable telephone according to the present invention;.
Figure 2:
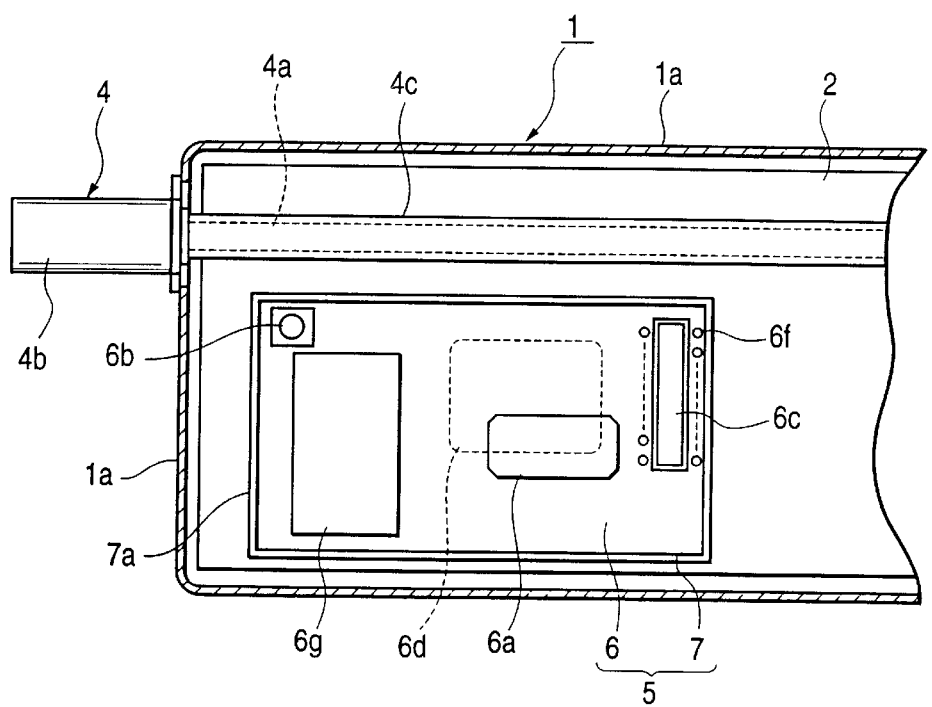
FIG. 2 is a plan view showing a principal portion thereof.
Figure 3:
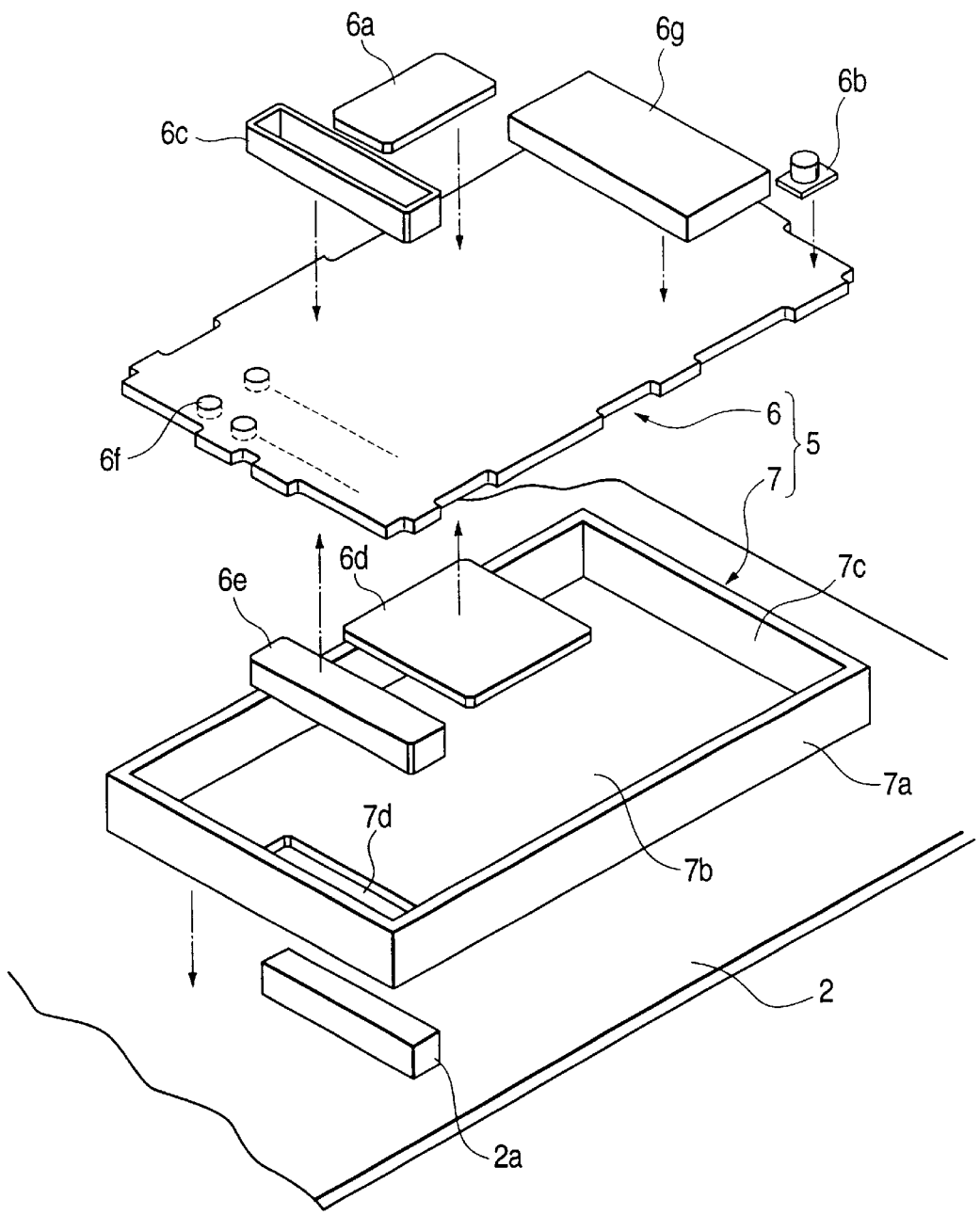
FIG. 3 is an exploded perspective view showing the transmitter-receiver unit according to the present invention.
Figure 4:
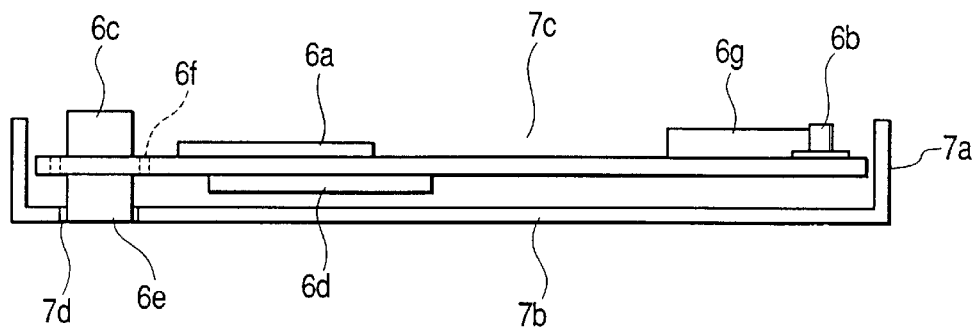
FIG. 4 is a sectional view thereof.
Figure 8:
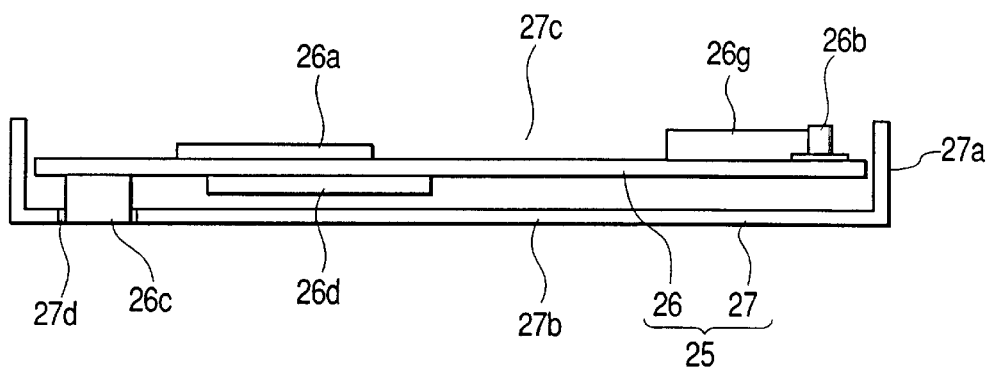
FIG. 8 is a sectional view thereof.
Figure 5:
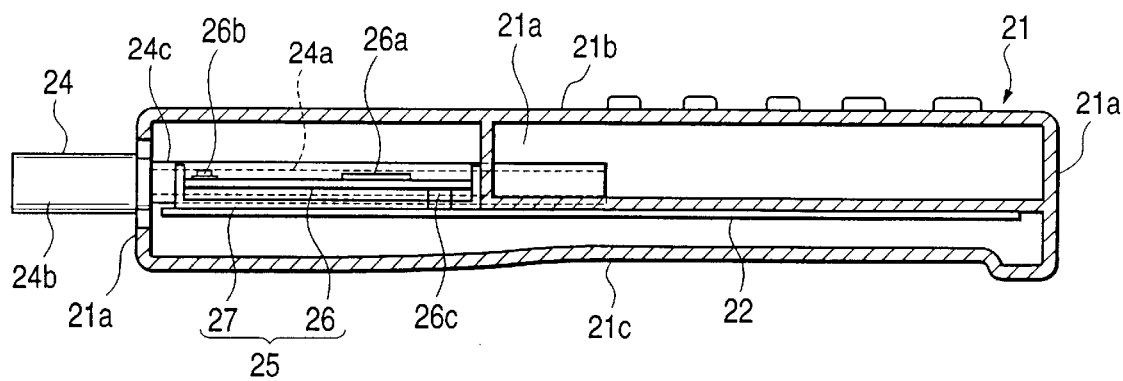
FIG. 5 is a sectional view showing a right-hand antenna type portable telephone using a conventional transmitter-receiver unit for a portable telephone.
Figure 6:
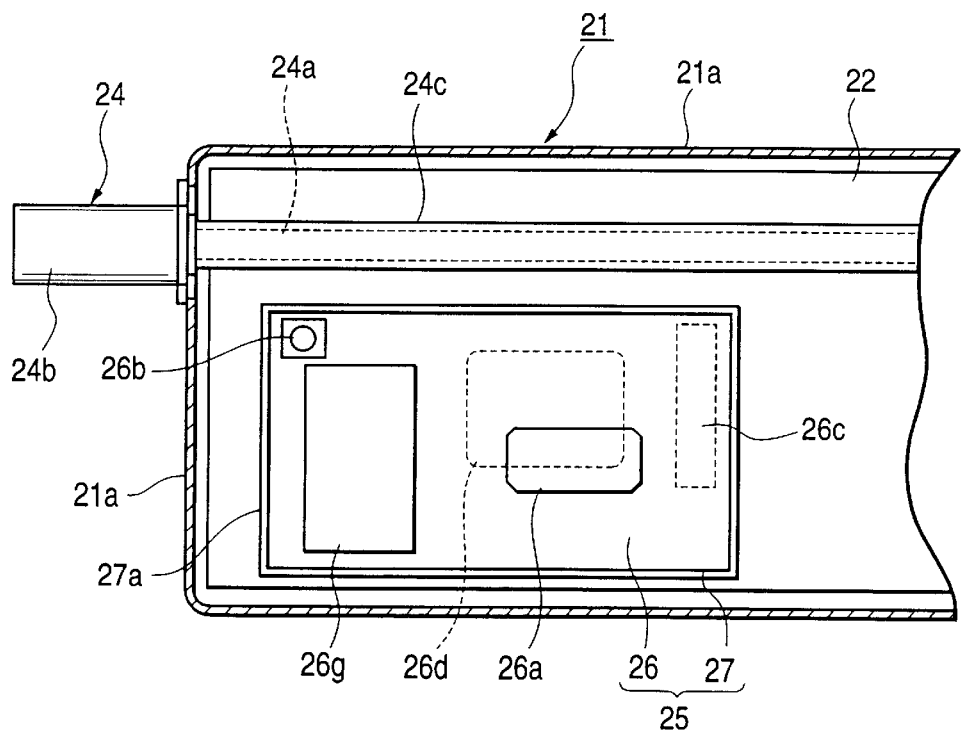
FIG. 6 is a plan view showing a principal portion thereof.
Figure 7:
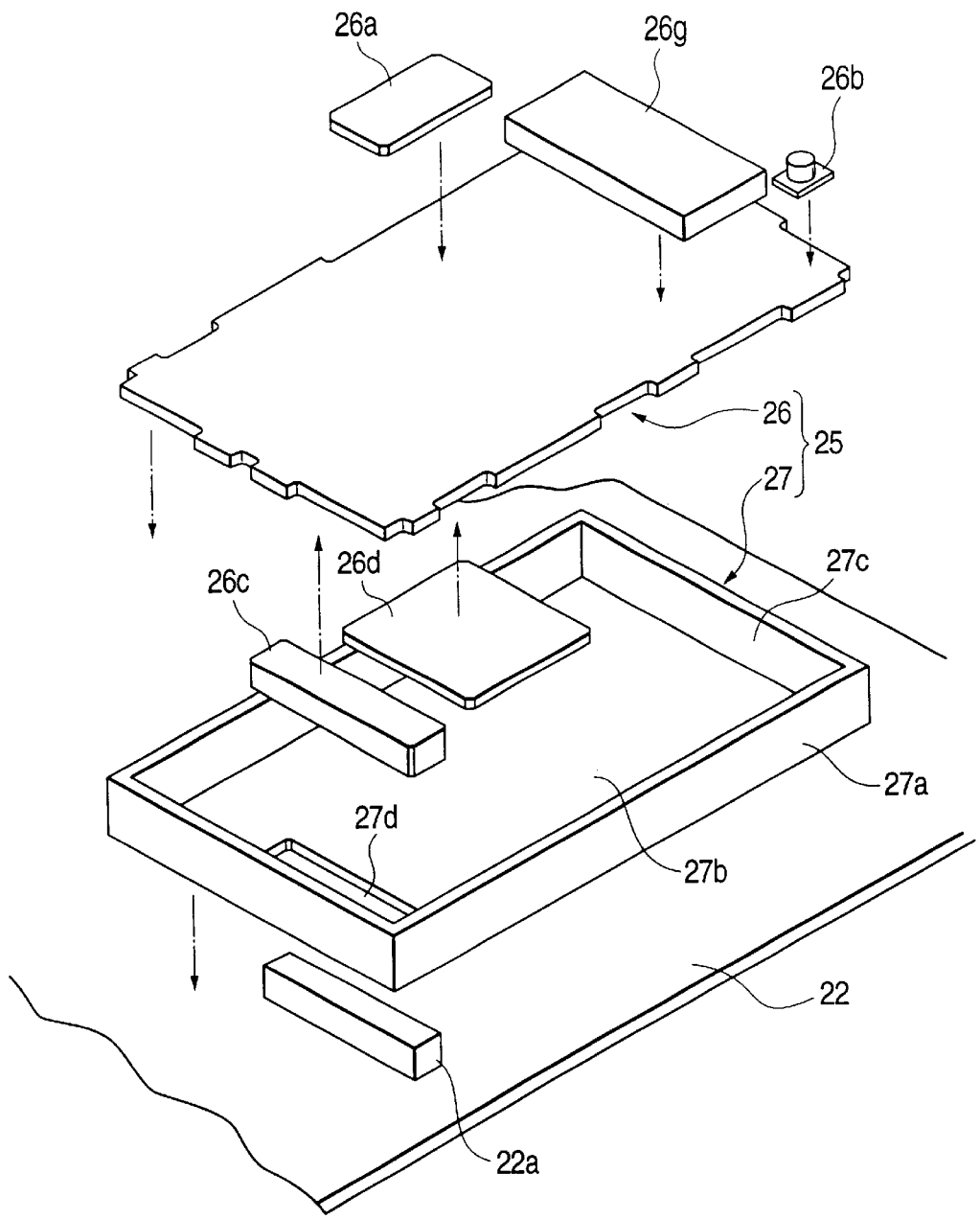
FIG. 7 is an exploded perspective view showing the conventional transmitter-receiver unit.

FIG. 1 is a sectional view showing a right-handed antenna type portable telephone using a transmitter-receiver unit for a portable telephone according to the present invention, FIG. 2 is a plan view showing a principal portion thereof, FIG. 3 is an exploded perspective view showing the transmitter-receiver unit according to the present invention, and FIG. 4 is a sectional view thereof.

As shown in FIGS. 1 to 4, a case 1 is formed in a generally box shape by molding with use of a synthetic resin material and it comprises side walls 1a as surrounding walls, as well as a surface wall 1b and a back wall 1c which close upper and lower sides, respectively, of the space defined by the side walls 1a.

A mother board 2 is formed in the shape of a flat plate using an insulating resin material. On the mother board 2 are mounted electronic components (not shown) such as a memory element for the storage of telephone numbers and an arithmetic unit for performing various arithmetic operations, as well as a male connector 2a having a plurality of terminals (not shown). A wiring pattern (not shown) of a predetermined shape, to which are soldered terminals of the electronic components and the male connector 2a, is also formed on the mother board 2. With a suitable means, the mother board 2 is mounted in proximity to the back wall 1c within the case 1. The male connector 2a of the mother board 2 is disposed on the upper surface side of the same board.

An antenna 4 is formed, for example, in a generally cylindrical shape using a magnetic material and it is for the transmission and reception of such as voice signals. The antenna 4 comprises a rod-like antenna portion 4a capable of being drawn out to the exterior, a knob portion 4b formed at the tip of the antenna portion 4a, and a cylindrical portion 4c for receiving the antenna portion 4a therein.

The knob portion 4b of the antenna 4 is disposed in an outwardly projecting state on the right-hand side of the case 1, and the cylindrical portion 4c which receives the antenna portion 4a therein is disposed inside the case 1 and in proximity to the right-hand side wall 1a.

A transmitter-receiver unit 5 for a portable telephone comprises a printed wiring board 6 which is in the shape of a flat plate and a generally box-shaped frame 7 for holding the printed wiring board 6.

The printed wiring board 6 is provided on a first side (for example, the surface side) thereof with electric components 6 such as a crystal oscillator or a coil, an antenna terminal member 6b formed at a right-hand corner position and connected to the antenna 4, an antenna duplexer 6g connected to the antenna terminal member 6b, a first female connector 6c having a plurality of terminals (not shown), and a wiring pattern (not shown) of a desired shape. The printed wiring board 6 is further provided on a second side (for example, the back side) thereof with an electric component 6d such as an integrated circuit (LSI), a chip resistor, or a chip capacitor, a second female connector 6e having a plurality of terminals (not shown), and a wiring pattern (not shown) of a desired shape.

The terminals of the first female connector 6c and those of the second female connector 6e are soldered respectively to the wiring patterns.

In the printed wiring board 6 are formed a plurality of through holes 6f for connection between the wiring patterns formed on the first and second sides respectively.

The first and second female connectors 6c, 6e disposed on the first and second sides respectively are located at positions opposed to each other with the printed wiring board 6 therebetween. The wiring pattern with the terminals of the first female connector 6c connected thereto and the wiring pattern with the terminals of the second female connector 6e connected thereto are connected with each other by the through holes 6f.

That is, the first and second female connectors 6c, 6e are connected with each other.

With the electric components 6a, 6d and the wiring patterns (not shown) there are constituted a transmission circuit block (not shown) which outputs a transmission signal to the antenna 4 for the transmission of a voice signal and the like from the antenna and a reception circuit block (not shown) which receives a reception signal from the antenna 4 and which outputs the received signal as a voice signal. These transmission and reception circuit blocks are connected to the antenna duplexer 6g, in which the reception signal and the transmission signal are separated from each other. A connecting terminal (not shown) of the antenna 4 is connected, for example by soldering, to the antenna terminal member 6b of the printed wiring board 6.

A frame 7 is formed in a generally box shape by cutting and bending a metallic flat plate and it comprises side walls 7a as surrounding walls, a bottom wall 7b which closes the lower side, and a receptacle portion 7c whose upper side is open. A rectangular hole 7d is formed in the bottom wall 7b.

With a suitable means, the printed wiring board 6 is mounted and held in the receptacle portion 7c of the frame 7. In this state, the printed wiring board 6 is located in proximity to the bottom wall 7b, and the second female connector 6e is inserted into the hole 7d of the bottom wall 7b.

The transmitter-receiver unit 5 having the printed wiring board 6 and the frame 7 is disposed on the mother board 2.

In this state, the male connector 2a of the mother board 2 and the second female connector 6e of the printed wiring board 6 are electrically connected with each other. Further, the antenna 4 and the transmitter-receiver 5 are disposed adjacent each other on the mother board 2.

Now, a description will be given below of a left-hand antenna type portable telephone using the transmitter-receiver unit for a portable telephone according to the present invention.

In the left-hand antenna type portable telephone, though not shown, an antenna is disposed near the left-hand side wall of the case, and in the transmitter-receiver unit of the invention disposed within the case, the printed wiring board as a constituent of the transmitter-receiver unit is disposed within the frame in such a manner that its first side (the side where the antenna duplexer is disposed) is located on the back side.

This transmitter-receiver unit is put on the mother board and in this state the first female connector disposed on the first side of the printed wiring board and the male connector disposed on the mother board are connected with each other.

Thus, by turning upside down the surface and the back of the printed wiring board as a constituent of the transmitter-receiver unit, the transmitter-receiver unit of this embodiment can be applied to both right and left antenna type portable telephones.

Although in the above embodiment the first and second female connectors are disposed respectively on the surface and the back of the printed wiring board as a constituent of the transmitter-receiver unit for a portable telephone, this constitutes no limitation. For example, a female connector may be disposed on only the back side of the printed wiring board opposed to the mother board, in other words, on only the board side connected to the male connector on the mother board.

Although in the above embodiments the connectors provided on the printed wiring board are female connectors, no limitation is made thereto. Any connectors are employable insofar as they can be connected to the connector mounted on the mother board.

Further, although in the above embodiment the antenna terminal member is disposed at a right end position on the first side (the surface side) of the printed wiring board which constitutes the transmitter-receiver unit for a portable telephone, there is made no limitation thereto. The antenna terminal member may be disposed at a left end position on the first side of the printed wiring board.

In the transmitter-receiver unit for a portable telephone according to the present invention, as set forth above, the antenna terminal member is disposed at one side end position of the printed wiring board and the connectors are formed so that they can be disposed any of opposed positions on both sides of the printed wiring board, so when a connector on the printed wiring board is connected to the connector on the mother board onto which the transmitter-receiver unit is to be mounted, both connectors can be connected together no matter which of the first and second side, (the surface and the back), of the printed wiring board may be faced up. Besides, since the antenna terminal member is disposed at a corner position of either the right or the left side, it can be connected easily to the right or the left antenna disposed near the antenna terminal member.

It follows that the transmitter-receiver unit of the present invention is applicable to both right and left antenna type portable telephones, thus giving rise to the effect that the number of design steps for the transmitter-receiver unit can be reduced.

What is claimed is:

1. A transmitter-receiver unit for a portable telephone, comprising:

a printed wiring board having a plurality of wiring patterns and a connector connecting portion connected to said wiring patterns;

a transmission circuit block for outputting a transmission signal and a reception circuit block for inputting a reception signal, both said transmission circuit block and said reception circuit block being mounted on said printed wiring board and connected to said wiring patterns;

an antenna duplexer connected to both said transmission circuit block and said reception circuit block;

an antenna terminal member, for the connection of an antenna, said antenna terminal member being mounted on said printed wiring board and connected to said antenna duplexer;

at least one connector mounted on said printed wiring board and having a plurality of terminals connected to said connector connecting portion; and a frame for holding said printed wiring board, wherein said antenna terminal member is disposed at a corner position of one side of said printed wiring board, and the two connector connecting portions are disposed respectively on both sides of said printed wiring board opposedly to each other at positions spaced away from said antenna terminal member, said two connector connecting portions being connected in parallel with each other through a through-hole conductor.

2. A transmitter-receiver unit for a portable telephone according to claim 1, wherein one of said connectors is connected to one of said connector connecting portions disposed on said printed wiring board on the side where said antenna terminal member is disposed, of said connector connecting portions located respectively on both sides of the printed wiring board.

3. A transmitter-receiver unit for a portable telephone according to claim 1, wherein the two connectors are connected respectively to the two connector connecting portions located respectively on both sides of said printed wiring board.

* * * * *